United States Patent
Mihara

Patent Number: 5,187,359
Date of Patent: Feb. 16, 1993

[54] ELECTRONIC IMAGING DEVICE FOR USE WITH PHOTOGRAPHIC CAMERAS FOR MINIMIZING ASTIGMATISM

[75] Inventor: Shinichi Mihara, Hachiouji, Japan

[73] Assignee: Olympus Optical Co., Ltd., Tokyo, Japan

[21] Appl. No.: 635,951

[22] Filed: Dec. 28, 1990

[30] Foreign Application Priority Data

Dec. 28, 1989 [JP] Japan .................. 1-343525

[51] Int. Cl.$^5$ .............................. H01J 40/14
[52] U.S. Cl. .................. 250/208.1; 359/726
[58] Field of Search ............ 250/208.1; 354/200, 354/201, 223–225; 359/726, 727, 740

[56] References Cited

U.S. PATENT DOCUMENTS

| | | | |
|---|---|---|---|
| 4,265,529 | 5/1981 | Yokota | 359/726 |
| 4,565,433 | 1/1986 | Kato | 354/201 |
| 4,826,301 | 5/1989 | Ikemori | 359/740 |

*Primary Examiner*—David C. Nelms
*Assistant Examiner*—S. Allen
*Attorney, Agent, or Firm*—Cushman, Darby & Cushman

[57] ABSTRACT

An electronic imaging device comprises a photographic lens system, a thin half mirror obliquely intersecting with the optical axis of the photographic lens system and an electronic image pickup element having a photoelectric converting surface on which rectangular picture elements are arranged regularly in a lattice pattern. Location I of the photoelectric converting surface is determined so as to satisfy the following conditions (1) and (2) or (3) and (4):

$$\frac{(2M+S)I_S + SI_M}{2(M+S)} < I < \frac{MI_S + (M+2S)I_M}{2(M+S)} \quad (1)$$

$$I_M > I_S \quad (2)$$

$$\frac{(2M+S)I_S + SI_M}{2(M+S)} > I > \frac{MI_S + (M+2S)I_M}{2(M+S)} \quad (3)$$

$$I_M < I_S \quad (4)$$

wherein the plane including the optical axis and the normal to the half mirror is taken as the meridional surface, the plane perpendicular to the meridional surface is taken as the sagittal surface, the reference symbols $I_M$ and $I_S$ represent the distances from an object located on the optical axis to the images formed by the photogrpahic lens system on the meridional surface and the sagittal surface respectively, and the reference symbols M and S designate the sizes of one of the picture elements as measured on the meridional surface and the sagittal surface respectively. The electronic imaging device is capable of suppressing degradation of resolution minimizing the level of the astigmatic difference.

3 Claims, 3 Drawing Sheets

ELECTRONIC IMAGING DEVICE FOR USE WITH PHOTOGRAPHIC CAMERAS FOR MINIMIZING ASTIGMATISM

BACKGROUND OF THE INVENTION a) Field of the Invention

The present invention relates to an electronic imaging device for photographic cameras, etc. which is equipped with a photographic optical system comprising, in the order from the object side, a photographic lens system, a thin half mirror or transparent plate obliquely intersecting with the optical axis of the photographic lens system, and an electronic image pickup means which has a light receiving surface on which rectangular picture elements ate arranged regularly in a lattice pattern and arranged substantially perpendicular to the optical axis.

b) Description of the Prior Art

One of the greatest features of the camera using electronic image pickup elements lies in that it has a small imaging surface on the electronic image pickup element comprised therein and is compatible with photographic lens systems having high vari-focal ratios. The camera of this type uses not only the electronic view type finder but also the optical type finder which can provide images of high quality. As a finder for use with a photographic optical system having a high vari-focal ratio, it is adequate from the technical viewpoint to select the TTL type since it permits easy correction of the deviation between a photographing range and an observation range. For using the TTL type finder in combination with the photographic optical system, rays are led from the photographic optical system to the side of the finder by using mirrors, conventionally by using the so-called quick return mirror which is placed out of the photographing optical path only during the moment of photographing. The camera using the electronic image pickup element has another feature that it permits high-speed successive photographing operation, which is remarkably hindered by the quick return mirror having a slow operation speed. It is therefore preferable to use a half mirror in the camera using the electronic image pickup element. The camera using the electronic image pickup element is compatible with two types of half mirrors: one consisting of a surface coated with a reflective film sandwiched between two glass blocks, and the other composed of a glass plate coated with a reflective film. The former type has a high degree of polarization and is apt to produce problems in light measurement or image formation. In order to lessen these problems, it is necessary to reduce reflectance of the former type of half mirror as much as possible, or minimize the angle formed between the normal to the reflecting surface and the optical axis thereof. Accordingly, it is preferable to use the latter type of half mirror which has a lower degree of polarization with the camera using the electronic image pickup element. Further, it is possible to use a thin transparent plate which is designed so as to totally reflect a fraction of rays in place of the thin half mirror. When the half mirror or transparent plate is used, however, an image formed by the transmitted light is effected by astigmatic difference. That is to say, a certain deviation is produced between the imaging point of the components in the direction comprised in the plane including the normal to the reflecting surface and the optical axis (meridional surface) and that of the components in the direction included in the plane perpendicular to the meridional surface (sagittal surface). Since the deviation is nearly proportional to thickness of the half mirror or the transparent plate, this mirror or plate must be made of a glass plate or a plate of synthetic resin, etc. as thin as possible, but the astigmatic difference may be negligible when high resolution is demanded.

SUMMARY OF THE INVENTION

A primary object of the present invention is to provide an electronic imaging device of the aforesaid type which is capable of minimizing degradation of resolution due to the astigmatic difference produced by arranging a thin half mirror or transparent plate in the imaging optical system in said device.

The electronic imaging device according to the present invention is designed so as to locate a photoelectric converting surface at a position I satisfying the following conditions (1) and (2) or the conditions (3) and (4):

$$\frac{(2M + S)I_S + SI_M}{2(M + S)} < I < \frac{MI_S + (M + 2S)I_M}{2(M + S)} \quad (1)$$

$$I_M > I_S \quad (2)$$

$$\frac{(2M + S)I_S + SI_M}{2(M + S)} > I > \frac{MI_S + (M + 2S)I_M}{2(M + S)} \quad (3)$$

$$I_M < I_S \quad (4)$$

wherein the plane including the normal to the half mirror or transparent plate and the optical axis of the photographic lens system is taken as the meridional surface, the plane perpendicular to the meridional surface is taken as the sagittal surface, the reference symbol $I_M$ represents coordinates of the meridional image point of the image of an object on the optical axis formed by the photographic lens system when the optical axis is taken as the co-ordinate axis, the reference symbol $I_S$ denotes co-ordinates of the sagittal image point of the image of the object on the optical axis formed by the photographic lens system when the optical axis is taken as the co-ordinate axis, the reference symbol M designates the size as measured along the meridional surface of the rectangular picture element, and the reference symbol S represents the size as measured along the sagittal surface of the rectangular picture element. When electric signals are to be obtained by mixing the electric charges accumlated in a plurality of picture elements adjacent to one another, however, the plurality of picture elements are to be collectively regarded as a single picture element.

The electronic imaging device according to the present invention comprises an imaging optical system having a high vari-focal ratio and permits successive photographing operations at a high speed (about 20 film frames per second) even when it is used in combination with the TTL type optical finder.

This and other objects as well as the features and the advantages of the present invention will become apparent from the following detailed description of the preferred embodiment when taken in conjunction with the accompanying drawings.

DESCRIPTION OF THE PREFERRED EMBODIMENT

Prior to description of the embodiment of the present invention, the fundamental principle of the electronic imaging device according to the present invention will be detailedly explained below.

Figure 1:
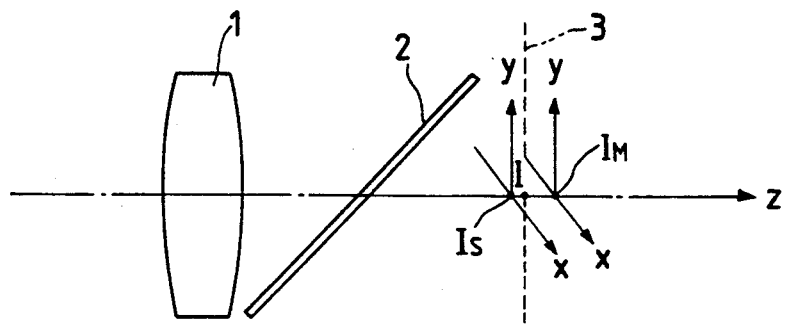
FIG. 1 is a sectional view illustrating the conception of the imaging optical system of the electronic imaging optical system according to the present invention.
Figure 2A:
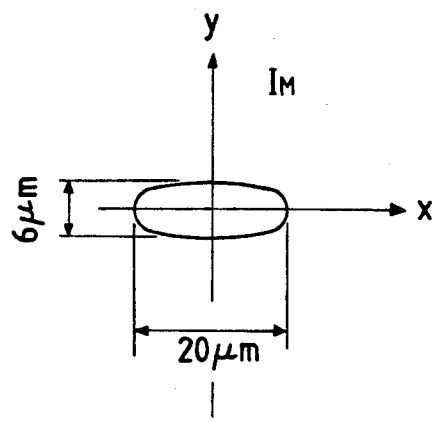
FIG. 2A and FIG. 2B are diagrams illustrating shapes of spot images formed at the meridional image point and the sagittal image point.
Figure 2B:
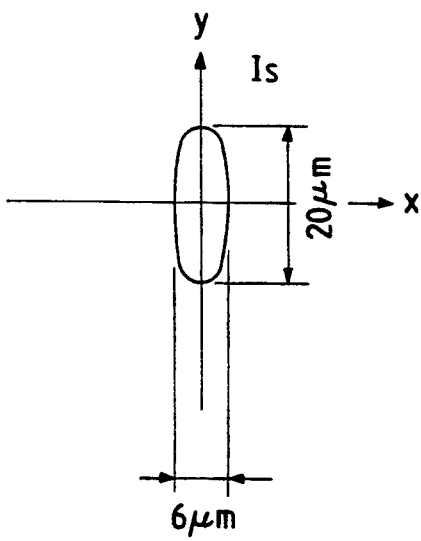
Figure 3:
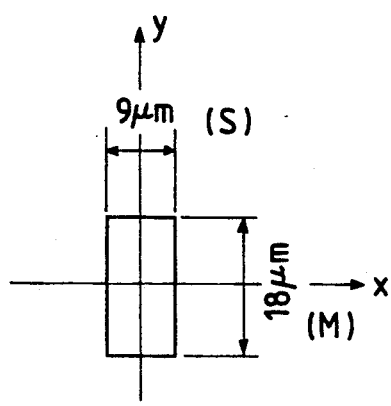
FIG. 3 is a diagram illustrating a shape of one of the picture elements arranged on an electronic image pickup element.
Figure 4:
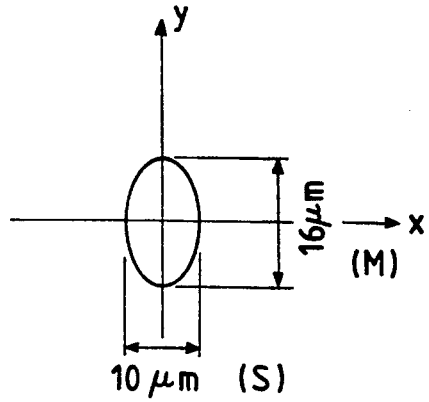
FIG. 4 is diagram illustrating a shape of a spot image at the interior division point between the meridional image point and the sagittal image point.

FIG. 1 is a sectional view illustrating the conception of the imaging optical system of the electronic imaging device according to the present invention which is composed of a photographic lens system 1, a thin half mirror 2 obliquely intersecting with the optical axis of the lens system 1, and an electronic image pickup element which comprises rectangular picture elements regularly arranged in a lattice pattern and has a photoelectric converting surface 3 nearly perpendicular to the said optical axis, the half mirror serving as a reflecting plate for leading rays toward a finder. Rays coming from an object located on the optical axis produce, on the transmission side of the half mirror 2, astigmatic difference, i.e., a certain deviation between an image point (the location $I_M$ on the meridional surface) of the components comprised in the plane including both the normal to the half mirror 2 and the optical axis and the image point (the location $I_S$ on the sagittal surface) of the components included in the plane perpendicular to the meridional surface (sagittal surface). When the photographic lens system is aplanatic, a nearly circular image of the object is formed at a middle location between the two imaging points, but nearly elliptic images are formed at other locations, for example, at the meridional image point $I_M$ and the sagittal image point $I_S$ as shown in FIG. 2A and FIG. 2B. Further, at the interior division point at Y:X between the meridional image point $I_M$ and the sagittal image point $I_S$, the image is nearly an ellipse which has a ratio of Y:X (Y>X) between the longer side and the shorter side thereof. When the ratio between the longer side and the shorter side of the rectangular picture element arranged on the photoelectric converting surface is nearly coincident with the ratio between the longer side and the shorter side of the ellipse, the imaging optical system can fully exhibit its performance (resolution, etc.) determined by the number of the picture elements arranged on the image pickup element. When the size of the picture element on the meridional surface is represented by M and the size of the picture element on the sagittal surface is designated by S, we obtain Y=M and X=S. When said photoelectric converting surface 3 is arranged nearly perpendicularly to the optical axis in the vicinity of the interior division point of M:S between the meridional image point $I_M$ and the sagittal image point $I_S=(SI_M+MI_S)/(M+S))$, the spot image formed with the imaging optical system has a shape close to that of the picture element as shown in FIG. 4, thereby providing high resolution both in the vertical direction and the horizontal direction. The shape and size of the spot image shown in FIG. 4 are those on the image surface at the location I defined below when the picture element is 9 μm wide in the X direction and 18 μm long in the y direction as illustrated in FIG. 3:

$$I = \frac{18I_S + 9I_M}{9 + 18} = \frac{2I_S + I_M}{3}$$

This location of the image surface will be represented by $I_{BEST}$. Now, let us designate the size of the picture element on the meridional surface by $m_1$, the size of the picture element on the sagittal surface by $S_1$, the length of the longer side of the spot image by $m_2$ and the length of the shorter side of the spot image by $S_2$, and assume that the photoelectric converting surface is located at the interior division point at $m_2:S_2$ between the meridional image point $I_M$ and the sagittal image point $I_S$. The half mirror 2 should desirably be as thin as possible from the optical viewpoint but must have sufficient thickness from the viewpoint of strength thereof. Therefore, let us assume that thickness t of the half mirror 2 is increased to such a degree that the spot image is just inscribed into the rectangular picture element, i.e., $m_2=m_1$ and $S_2=S_1$ (t=$t_{MAX}$) Then, the imaging optical system comprising the half mirror 2 has resolution equal to the Nyquist frequency in the meridional and sagittal directions respectively, thereby posing no problem. When the photoelectric converting surface is shifted from the location, for example, toward the meridional image point $I_M$, the resolution in the meridional direction is enhanced but limited at best to the Nyquist frequency due to a moiré strip preventive filter. On the other hand, resolution in the sagittal direction is lower than the Nyquist frequency due to aggravation of blurring. However, slight degradation of resolution will be allowable for practical use, especially when the thickness t of the half mirror is thinner than $t_{MAX}$ described above. It may be considered that the degradation of resolution is allowable for practical use within the range from the middle point between $I_S$ and $I_{BEST}$ to the middle point between $I_{BEST}$ to $I_M$.

The middle point between $I_S$ and $I_{BEST}$ is:

$$\frac{I_S + I_{BEST}}{2} = \left(I_S + \frac{MI_S + SI_M}{M+S}\right)/2 = \frac{(2M+S)I_S + SI_M}{2(M+S)}$$

and the middle point between $I_{BEST}$ and $I_M$ is:

$$\frac{I_{BEST} + I_M}{2} = \left(\frac{MI_S + (M+2S)I_M}{2(M+S)}\right)$$

Hence, the range within which degradation of image quality or resolution is allowable is expressed as follows:

$$\frac{(2M+S)I_S + SI_M}{2(M+S)} < I < \frac{MI_S + (M+2S)I_M}{2(M+S)} \quad (1)$$

When relationship between $I_M$ and $I_S$ is:

$$I_M > I_S \quad (2)$$

In contrast, the range within which degradation of image quality or resolution is allowable is expressed as follows:

$$\frac{(2M+S)I_S + SI_M}{2(M+S)} > I > \frac{MI_S + (M+2S)I_M}{2(M+S)} \quad (3)$$

When relationship between $I_M$ and $I_S$ is:

$$I_M < I_S \quad (4)$$

If the location I of the image surface is not within the range defined above, resolution will be undesirable far lower than the Nyquist frequency in the meridional or sagittal direction. Further, since resolution is made far lower than the Nyquist frequency by the half mirror 2 which is too thick, it is desirable to design the half mirror 2 so as to have thickness t satisfying the following condition:

$$t < 0.2 \, F_{NO} \quad (5)$$

wherein the reference symbol $F_{NO}$ represents the F-number of the photographic lens system. If the thickness t of the half mirror 2 is larger than $0.2 \, F_{NO}$, astigmatic difference will be aggravated, thereby degrading resolution far lower than the Nyquist frequency in either or both of the meridional and sagittal directions.

Figure 5:
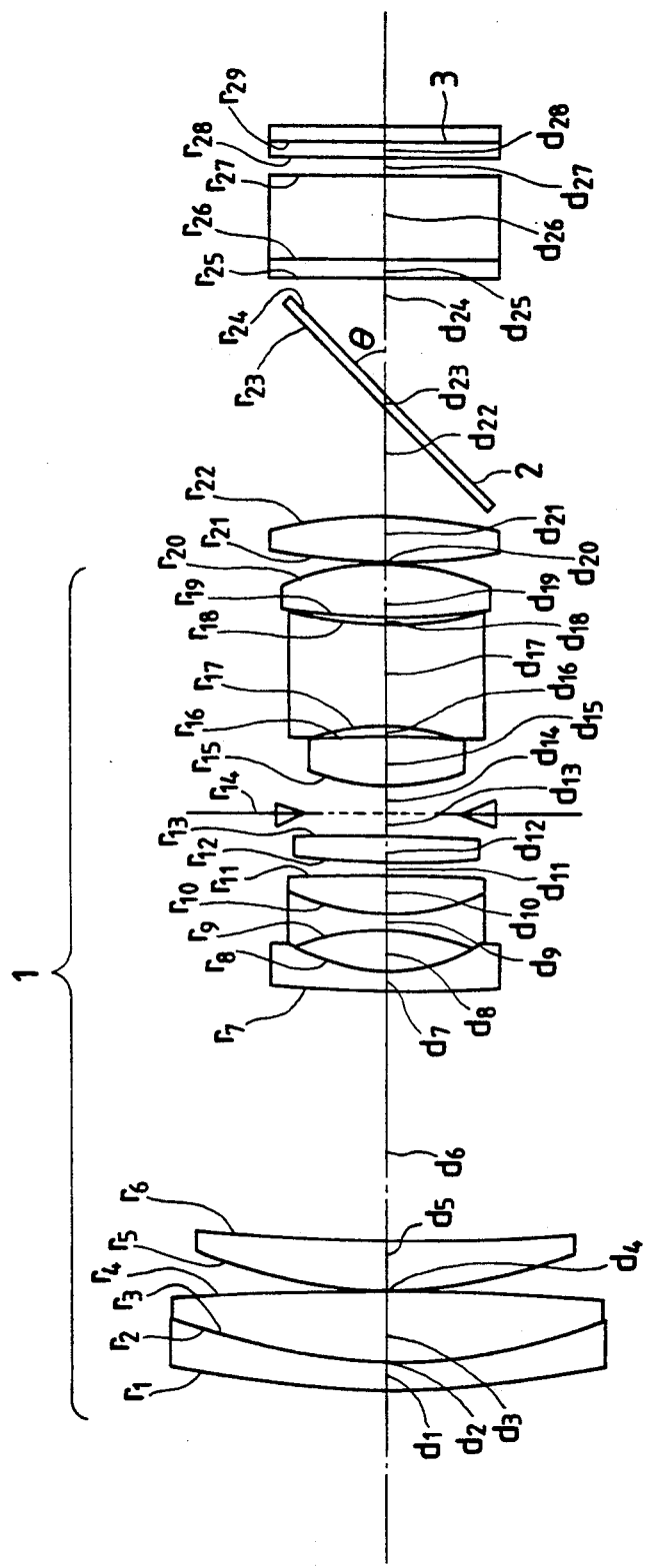
FIG. 5 is a sectional view illustrating an imaging optical system of an embodiment of the present invention.

FIG. 5 illustrates an embodiment of the imaging optical system of the electronic imaging device according to the present invention, which has the numerical data below:

| | | | |
|---|---|---|---|
| $r_1 = 58.7060$ | | | |
| | $d_1 = 1.6000$ | $n_1 = 1.84666$ | $\nu_1 = 23.78$ |
| $r_2 = 32.7940$ | | | |
| | $d_2 = 0.0800$ | | |
| $r_3 = 34.0170$ | | | |
| | $d_3 = 3.6000$ | $n_2 = 1.60311$ | $\nu_2 = 60.70$ |
| $r_4 = -296.6310$ | | | |
| | $d_4 = 0.1500$ | | |
| $r_5 = 27.3950$ | | | |
| | $d_5 = 2.9000$ | $n_3 = 1.69680$ | $\nu_3 = 55.52$ |
| $r_6 = 126.2960$ | | | |
| | $d_6 = 13.857$ (Variable) | | |
| $r_7 = 94.2810$ | | | |
| | $d_7 = 0.9000$ | $n_4 = 1.83400$ | $\nu_4 = 37.16$ |
| $r_8 = 9.3580$ | | | |
| | $d_8 = 2.5000$ | | |
| $r_9 = -13.1840$ | | | |
| | $d_9 = 0.9000$ | $n_5 = 1.74320$ | $\nu_5 = 49.31$ |
| $r_{10} = 13.1840$ | | | |
| | $d_{10} = 2.2000$ | $n_6 = 1.84666$ | $\nu_6 = 23.78$ |
| $r_{11} = -93.3350$ | | | |
| | $d_{11} = 0.600$ (Variable) | | |
| $r_{12} = 47.8790$ | | | |
| | $d_{12} = 1.6000$ | $n_7 = 1.83400$ | $\nu_7 = 37.16$ |
| $r_{13} = -98.2020$ | | | |
| | $d_{13} = 1.300$ (Variable) | | |
| $r_{14} = \infty$ (Stop) | | | |
| | $d_{14} = 1.6000$ | | |
| $r_{15} = 13.8640$ | | | |
| | $d_{15} = 2.8000$ | $n_8 = 1.70154$ | $\nu_8 = 41.21$ |
| $r_{16} = -68.4970$ | | | |
| | $d_{16} = 0.4600$ | | |
| $r_{17} = -13.7800$ | | | |
| | $d_{17} = 6.0000$ | $n_9 = 1.80518$ | $\nu_9 = 25.43$ |
| $r_{18} = 20.9170$ | | | |
| | $d_{18} = 0.3800$ | | |
| $r_{19} = 54.9350$ | | | |
| | $d_{19} = 2.8000$ | $n_{10} = 1.69680$ | $\nu_{10} = 55.52$ |
| $r_{20} = -14.9350$ | | | |
| | $d_{20} = 0.1500$ | | |
| $r_{21} = 31.2930$ | | | |
| | $d_{11} = 2.5000$ | $n_{11} = 1.69680$ | $\nu_{11} = 55.52$ |
| $r_{22} = -31.2930$ | | | |
| | $d_{22} = 13.1500$ | | |
| $r_{23} = \infty$ | | | |
| | $d_{23} = 1.0000$ | $n_{12} = 1.51633$ | $\nu_{12} = 64.15$ |
| $r_{24} = \infty$ | | | |
| | $d_{24} = 4.8000$ | $n_{13} = 1.54771$ | $\nu_{13} = 62.83$ |
| $r_{25} = \infty$ | | | |
| | $d_{25} = 1.0000$ | | |
| $r_{26} = \infty$ | | | |
| | $d_{26} = 0.7000$ | $n_{14} = 1.51633$ | $\nu_{14} = 64.15$ |
| $r_{27} = \infty$ | | | |
| | $d_{27} = 0.3100$ | | |
| $r_{28} = \infty$ | | | |
| | $d_{28} = 0.6000$ | $n_{15} = 1.48749$ | $\nu_{15} = 70.20$ |
| $r_{29} = \infty$ | | | |
| $f = 26.14710$, | $IM \cdot H = 4.20000$, | | $F_{NO} = 2.713$, |
| $t = 0.15$ mm, | $\theta = 45°$ | | | wherein the reference symbol $r_i$ the radius of curvature on a lens surface of interest, the reference symbol $d_i$ denotes an airspace reserved between lens surfaces, the reference symbol $n_i$ designates the refractive index of a lens element of interest, and the reference symbol $\nu_i$ represents the Abbe's number of the lens element of interest. Further, the reference symbol f denotes the focal length of the imaging optical system as a whole, the reference symbol IM.H designates the image height, the reference symbol $F_{NO}$ represents the effective F-number of the photographic lens system, the reference symbol t designates the thickness of the half mirror 2 and the reference symbol $\theta$ denotes the inclination angle of the half mirror 2.

Figure 6:
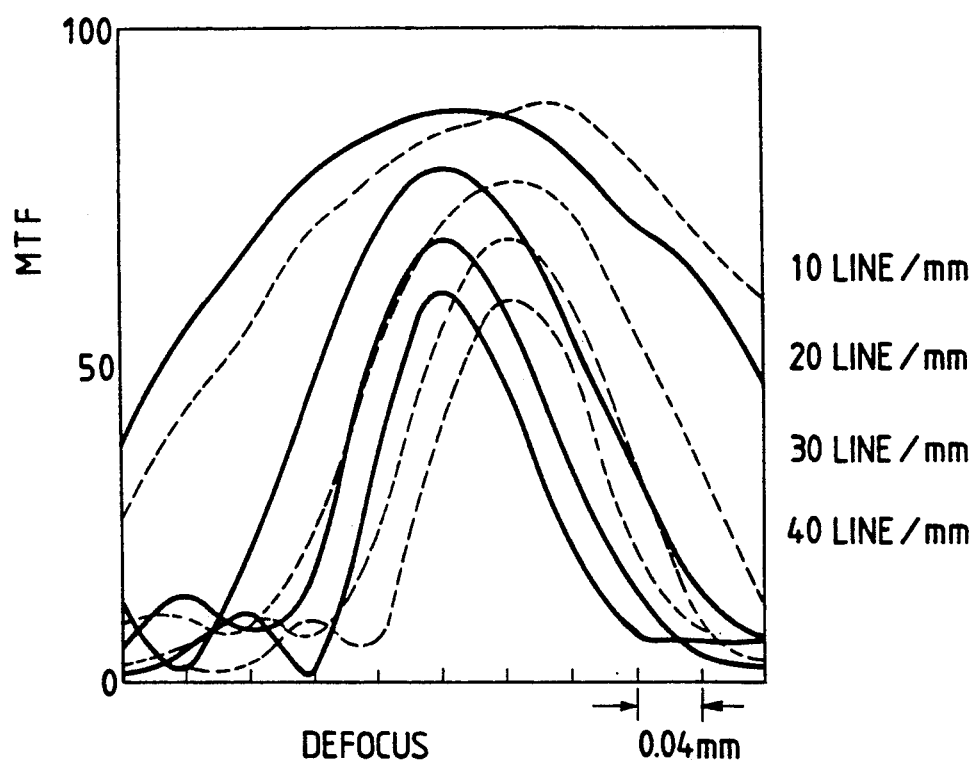
FIG. 6 shows graphs illustrating M-D characteristics of the embodiment of the present invention.

FIG. 6 shows graphs illustrating the M-D characteristic (MTF versus degree of defocus on the optical axis) of the embodiment of the present invention, i.e., astigmatic difference. The solid lines and the dashed lines represent the characteristics in the sagittal direction and the meridional direction respectively. This drawing clarifies that the so-called astigmatic difference, i.e., separation between the meridional image point and the sagittal image point, is produced even at the central parts; of the curves (differences of approximately 0.05 mm between the peaks of the M-D curves). The spot image has a shape which is nearly an ellipse having a longer side in the sagittal direction at the meridional image point $I_M$ and another shape which is nearly an ellipse having the longer side in the meridional direction at the sagittal image point $I_S$ (see FIG. 2). Further, the spot image is nearly a circle in the vicinity of the middle point between the two imaging points. When the shape of the picture element arranged on the photographic converting surface of the electronic image pickup element is a rectangle which has a size of M×S and a longer side coincident with the meridional direction, the spot image has a shape close to an ellipse having length in the meridional direction: length in the sagittal direction=M : S, i.e., close to the shape of the picture element, whereby the imaging optical system has high resolution at the following location of image surface:

$$I = \frac{MI_S + SI_M}{M + S}$$

Though the description has been made above on a case where the picture element arranged on the electronic image pickup element has the longer side in the meridional direction and the shorter side in the sagittal direction, it is needless to say that the conditional formulae (1) and (2) or (3) and (4) apply to another case where the picture element has the longer side in the sagittal direction and the shorter side in the meridional direction.

What is claimed is:

1. An electronic imaging device provided with an imaging optical system comprising a photographic lens system, a thin light transmissive plate-like member obliquely intersecting with the optical axis of said photographic lens system, and an electronic image pickup means for receiving light transmitted by said plate-like member having a light receiving surface on which rectangular picture elements are arranged regularly in a lattice pattern and arranged substantially perpendicular to said optical axis, wherein said light receiving surface is located at a position I satisfying the following conditions (1) and (2):

$$\frac{(2M + S)I_S + SI_M}{2(M + S)} < I < \frac{MI_S + (M + 2S)I_M}{2(M + S)} \quad (1)$$

$$I_M > I_S \quad (2)$$

wherein the plane including the normal to said thin plate-like member and said optical axis is taken as the meridional surface, the plane perpendicular to said meridional surface is taken as the sagittal surface, the reference symbol $I_M$ represents co-ordinates of the meridional image point of the image of an object on said optical axis formed by said photographic lens system when said optical axis is taken as the coordinate axis, the reference symbol $I_S$ denotes co-ordinates of the sagittal image point of the image of the object on said optical axis formed by said photographic lens system when said optical axis is taken as the co-ordinate axis, the reference symbol M designates the size as measured along the meridional surface of said rectangular picture element, and the reference symbol S represents the size as measured along the sagittal surface of said rectangular picture element.

2. An electronic imaging device provided with an imaging optical system comprising a photographic lens system, a thin light transmissive plate-like member obliquely intersecting with the optical axis of said photographic lens system, and an electronic image pickup means for receiving light transmitted by said plate-like member having a light receiving surface on which rectangular picture elements are arranged regularly in a lattice pattern and arranged substantially perpendicular to said optical axis, wherein said light receiving surface is located at a position I satisfying the following conditions (3) and (4):

$$\frac{(2M + S)I_S + SI_M}{2(M + S)} > I > \frac{MI_S + (M + 2S)I_M}{2(M + S)} \quad (3)$$

$$I_M < I_S \quad (4)$$

wherein the plane including the normal to said thin plate-like member and said optical axis is taken as the meridional surface, the plane perpendicular to said meridional surface is taken as the sagittal surface, the reference symbol $I_M$ represents co-ordinates of the meridional image point of the image of an object on said optical axis formed by said photographic lens system when said optical axis is taken as the co-ordinate axis, the reference symbol $I_S$ denotes co-ordinates of the sagittal image point of the image of the object on said optical axis formed by said photographic lens system when said optical axis is taken as the co-ordinate axis, the reference symbol M designates the size as measured along the meridional surface of said rectangular picture element, and the reference symbol S represents the size as measured along the sagittal surface of said rectangular picture element.

3. An electronic imaging device according to claim 1 or 2 adapted to satisfy the following condition (5):

$$t < 0.2 \, F_{NO} \quad (5)$$

wherein the reference symbol t represents the thickness of said thin plate-like member and the reference symbol $F_{NO}$ designates the F-number of said photographic lens system.

* * * * *